US007021001B1

(12) United States Patent
Schooler

(10) Patent No.: US 7,021,001 B1
(45) Date of Patent: Apr. 4, 2006

(54) ANTI-PINCH POWER WINDOW SYSTEM

(76) Inventor: Paul T. Schooler, 16285 Erin St., Fraser, MI (US) 48026

( * ) Notice: Subject to any disclaimer, the term of this patent is extended or adjusted under 35 U.S.C. 154(b) by 0 days.

(21) Appl. No.: 11/161,811

(22) Filed: Aug. 17, 2005

(51) Int. Cl.
*E05F 15/02* (2006.01)
*E05F 15/08* (2006.01)
*F16H 27/02* (2006.01)

(52) U.S. Cl. .................. 49/28; 49/26; 49/349; 49/362; 318/469; 318/282; 74/89.23; 74/89.14

(58) Field of Classification Search .................... 49/26, 49/27, 28, 349, 362, 350; 318/469, 282, 318/283, 280, 468; 74/89.23, 89.14, 89.39, 74/425, 424.7
See application file for complete search history.

(56) References Cited

U.S. PATENT DOCUMENTS

| | | | | |
|---|---|---|---|---|
| 2,945,691 | A * | 7/1960 | Swift et al. | 74/89.36 |
| 2,947,535 | A * | 8/1960 | Crosby | 74/424.92 |
| 2,955,816 | A * | 10/1960 | Wise | 49/349 |
| 3,691,684 | A * | 9/1972 | Boneck | 49/28 |
| 4,131,830 | A * | 12/1978 | Lee et al. | 318/469 |
| 5,012,613 | A * | 5/1991 | Sekine | 49/362 |
| 5,950,365 | A | 9/1999 | Lieb et al. | |
| 6,051,945 | A * | 4/2000 | Furukawa | 318/280 |
| 6,078,252 | A * | 6/2000 | Kulczycki et al. | 340/425.5 |
| 6,366,042 | B1 * | 4/2002 | Gerbetz | 49/28 |
| 6,426,604 | B1 * | 7/2002 | Ito et al. | 318/282 |
| 6,427,385 | B1 * | 8/2002 | Fin | 49/340 |
| 6,502,352 | B1 | 1/2003 | Bonduel | |
| 6,573,677 | B1 | 6/2003 | Gerbetz | |
| 6,633,147 | B1 * | 10/2003 | Gerbetz | 318/434 |
| 6,756,754 | B1 * | 6/2004 | Bent et al. | 318/282 |
| 6,794,837 | B1 * | 9/2004 | Whinnery et al. | 318/282 |
| 6,806,664 | B1 * | 10/2004 | Beishline | 318/280 |
| 6,840,113 | B1 * | 1/2005 | Fukumura et al. | 318/469 |
| 6,889,578 | B1 * | 5/2005 | Spaziani et al. | 74/425 |
| 6,906,487 | B1 * | 6/2005 | de Frutos | 318/280 |
| 6,936,984 | B1 * | 8/2005 | Wilson | 318/280 |
| 6,936,988 | B1 * | 8/2005 | Nakazawa et al. | 318/469 |
| 6,940,246 | B1 * | 9/2005 | Mochizuki et al. | 318/469 |
| 6,952,087 | B1 * | 10/2005 | Lamm | 318/283 |
| 6,966,149 | B1 * | 11/2005 | Fenelon | 49/349 |

* cited by examiner

*Primary Examiner*—Hugh B. Thompson, II
(74) *Attorney, Agent, or Firm*—Gregory T. Zalecki

(57) ABSTRACT

An anti-pinch power window system is comprised of a hub, a motor, a threaded rod, a base, a spring, a frame, a bracket, a threaded drive nut, a reversing switch and an electronic circuit. The motor rotates the hub. The rod is slidably attached to the hub. The base is attached to the rod. The spring surrounds the rod and is positioned such that it is compressed by movement of the base toward the hub. The bracket is attached to the frame and holds the drive nut. The rod is threaded into the drive nut. The reversing switch senses downward movement of the base and in response to such downward movement signals the electronic circuit to reverse the polarity of the motor input voltage, thereby reversing the direction of the travel of the frame. A closing window within the frame will reverse direction when it encounters an obstruction.

17 Claims, 9 Drawing Sheets

ANTI-PINCH POWER WINDOW SYSTEM

BACKGROUND

Many vehicles have power window systems. Such systems provide for the power driven opening and closing of vehicle windows in response to the activation of a switch. During normal operation a window is closed by the activation of a switch. When the switch is activated the window travels to a fully closed position. However, on occasion, an obstruction is encountered by the leading edge of the window during the close cycle. The obstruction may be part of a human body. Occasionally, a power window activation switch is accidentally activated by a child when the child has his or her head, neck or arms within the window opening. If an obstruction is met by the leading edge of the window while the window is being closed, movement of the window should be immediately stopped and reversed.

A power sunroof is a version of a power window. A power sunroof system opens and closes an opening within the roof of a vehicle. If an obstruction is met by the leading edge of the sunroof while the sunroof is being closed, movement of the sunroof should also be immediately stopped and reversed.

This invention provides a power window system wherein a vehicle window, including a sunroof, is stopped and reversed in response to an obstruction being encountered during closing. The anti-pinch power window system is simple, reliable and can be manufactured cost effectively.

SUMMARY

An anti-pinch power window system is comprised of a hub, a threaded rod, a base, a spring, a bracket, a threaded drive nut and a switch.

The hub is adapted to hold a threaded rod. The hub is also adapted to allow the threaded rod to slide along its longitudinal axis within the hub.

The threaded rod is attached to the hub. This can be accomplished by providing the threaded rod with an end having a square cross-section which slidingly fits within a similarly configured, but slightly larger, square opening within the hub. Thus, the threaded rod can slide along its longitudinal axis within the hub, but cannot rotate independently of the hub.

The base has a top side and a bottom side and is attached to the threaded rod. Preferably, the base is cylindrically shaped and is securely attached to the lower section of the threaded rod by an alien screw. The bottom side of the base faces the hub.

The spring is positioned between the bottom side of the base and the hub such that the spring is compressible by movement of the base toward the hub. This can be accomplished by placing a cylindrically shaped spring around the threaded rod so that an end of the spring is positioned adjacent to the bottom side of the base. The spring is compressible by movement of the base toward the hub.

The bracket is fabricated such that it may be attached to a window frame and such that it will retain a drive nut. The term window frame includes a sunroof frame.

The threaded drive nut is screwed onto the upper section of the threaded rod. The drive nut should have a flat side to prevent rotational movement when the flat side of the drive nut contacts the bracket or a frame attached to the bracket. The drive nut is positioned within the bracket such that rotation of the drive nut is limited. When the bracket is attached to a frame containing a window, the bracket, frame and window will move in response to rotation of the threaded rod.

The switch is positioned between the bottom side of the base and the hub such that movement of the base toward the hub will change the state of the switch. The switch should have a mechanical activator positioned between the bottom side of the base and the hub such that movement of the base toward the hub will depress the mechanical activator and change the state of the switch.

If a vehicle has been preassembled so that it contains a hub drive motor, a window frame and an electronic circuit which changes the polarity of the voltage powering the motor when the switch changes electronic on-off states, the device described may be mechanically installed and electrically wired to create a functional anti-pinch power window system. Otherwise, a motor, a frame and an electronic circuit are added to the device. The motor is engaged with the hub such that it is capable of rotating the hub. The rotational direction of the motor is selectable by the polarity of an input voltage which powers the motor. Preferably, the motor is an electrically reversible motor so that a window encountering an obstruction will reverse direction after it stops moving in the closing direction.

The frame is sized and shaped to hold a window. The window may be a conventional window or a sunroof. The bracket is attached to the frame.

The switch cooperates with the electronic circuit to change the polarity of the voltage powering the motor such that changing the state of the switch reverses the rotational direction of the threaded rod. In another embodiment of this invention the switch would cooperate with the electronic circuit to eliminate the voltage powering the motor when the state of the switch is changed by compression from the base. Preferably, when the switch changes state by being compressed by the base moving toward the hub, the electronic circuit reverses the polarity to the motor and when the switch changes state again by being decompressed from and separated from the base, the polarity of the voltage powering the motor will not change. Thus, the window will continue to travel toward its open position even after contact between the obstruction and the window is eliminated.

A base stop roller should be positioned to contact the top side of the base while the device is at rest. The base stop roller is adapted to roll in response to rotation of the base and to prevent upward movement, toward the bracket, of the base and the attached threaded rod.

The frame is sized and shaped to hold a window when the device is intended to be used to power a conventional window. The frame is sized and shaped to hold a sunroof when the device is intended to be used to power a conventional sunroof.

Optionally, the anti-pinch power window system may include a positionally adjustable spring seat in contact with the spring. This will permit the force exerted by the spring upon the threaded rod to be adjusted. Thus, the amount of force created by an obstruction during the closing cycle of the window which will activate the switch and prevent the window from closing further (by stopping it or reversing its direction) can be adjusted. Preferably, the positionally adjustable spring seat is an internally threaded cylinder having an outer diameter which is smaller than the outer diameter of the base. The internal threads are adapted to mate witch the threads of the threaded rod. The positionally adjustable spring seat is positioned so that it is in contact with the end of the spring nearest the base. Further, the positionally adjustable spring seat is adjusted so that it compresses the spring to a selected and desired degree. The positionally adjustable spring seat should be secured to the threaded rod by an alien screw.

The electronic circuit should be comprised of a flip-flop switch. The flip-flop switch is wired to change its state in response to the change of state of the switch positioned between the base and the hub. The flip-flop switch is wired to reverse the polarity of the input voltage to the motor in response to a change of state of the flip-flop switch. The flip-flop switch should be adapted and wired to reverse the polarity of the input voltage to the motor only when the switch positioned between the base and the hub is compressed, and not when that switch is a decompressed.

DRAWINGS

These and other features, aspects, and advantages of the present invention will become better understood with regard to the following description, appended claims, and accompanying drawings where:

DETAILED DESCRIPTION

Figure 1:
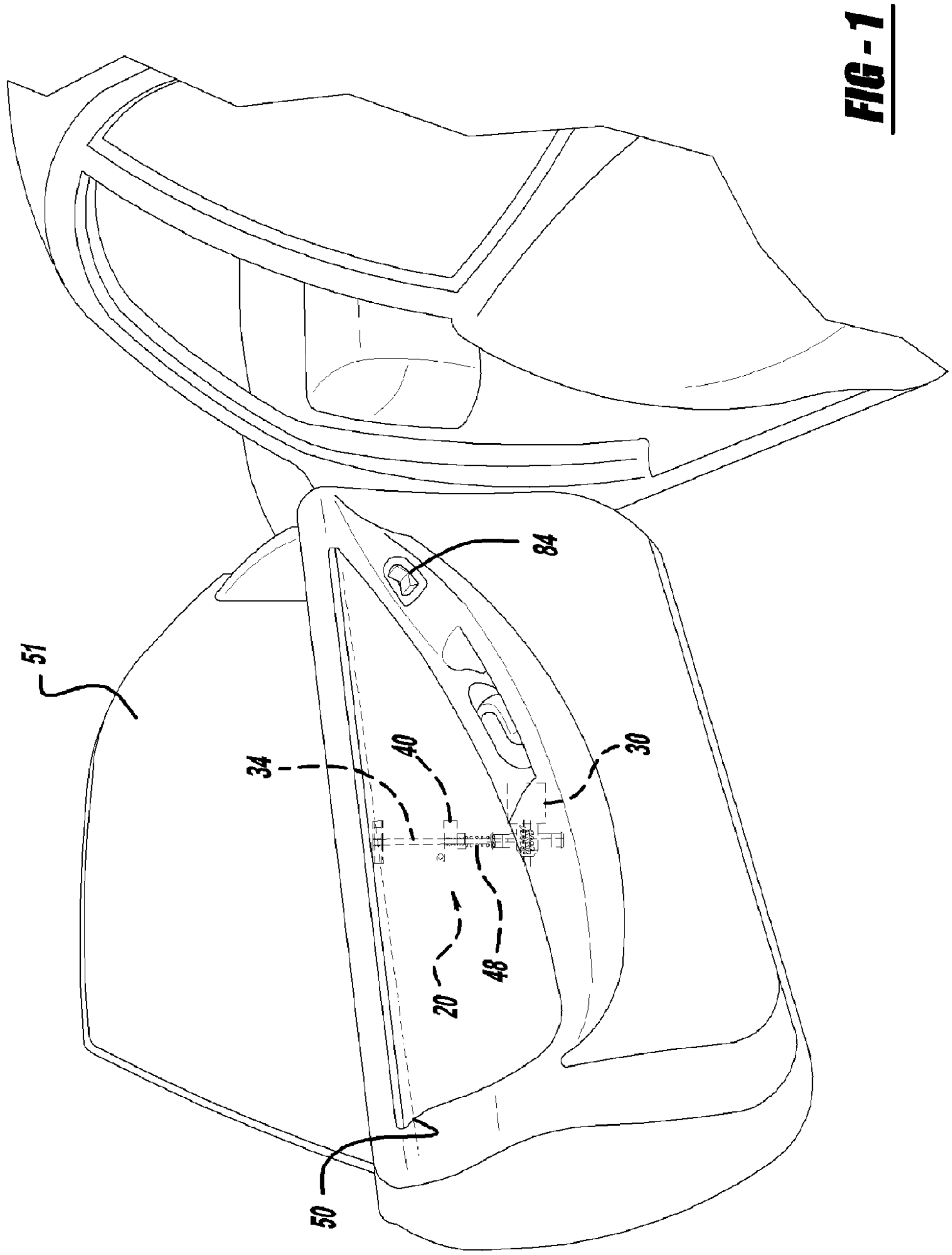
FIG. 1 is a perspective view of an anti-pinch power window system installed within the door of an automobile.

The preferred embodiment of an anti-pinch power window system 20 is shown in FIGS. 1–9. An anti-pinch power window system 20 is comprised of a rotatable hub 25, a motor 30, a threaded rod 34, a base 40, a spring 48, a frame 50, a bracket 52, a threaded drive nut 54, a reversing switch 58 and an electronic circuit 62.

The rotatable hub 25 functions as a drive shaft. It is adapted to securely hold the threaded rod 34. The hub 25 is adapted to allow the threaded rod 34 to slide along its longitudinal axis within the hub 25. This can be accomplished by providing the hub 25 with a square opening 24. The square opening 24 is larger than a square end provided on the threaded rod 34. A boot 22 surrounds the hub 25, but does not rotate with the hub 25. The boot 25 is provided with a spring seat 26 for receiving and seating one end of the spring 48.

The threaded rod 34 has an upper section 36 and a lower section 38. The end of the lower section 38 of the threaded rod 34 has a square cross-section. The square cross-section of the end of the threaded rod 34 is smaller than the square opening 24 of the hub 25. The square cross-section of the end of the threaded rod 34 is large enough to prevent the hub 25 from rotating independently of the threaded rod 34. This configuration of the square end of the threaded rod 34 and the square opening 24 of the hub allows the threaded rod 34 to be slidably and non-rotatably attached to the hub 24. When the hub 24 rotates, the threaded rod 34 rotates. The threaded rod 34 may slide within the square opening 24 of the hub 25 along the longitudinal axis of the threaded rod 34. The longitudinal axis of the threaded rod 34 coincides with the longitudinal axis of the hub 25.

Figure 2:
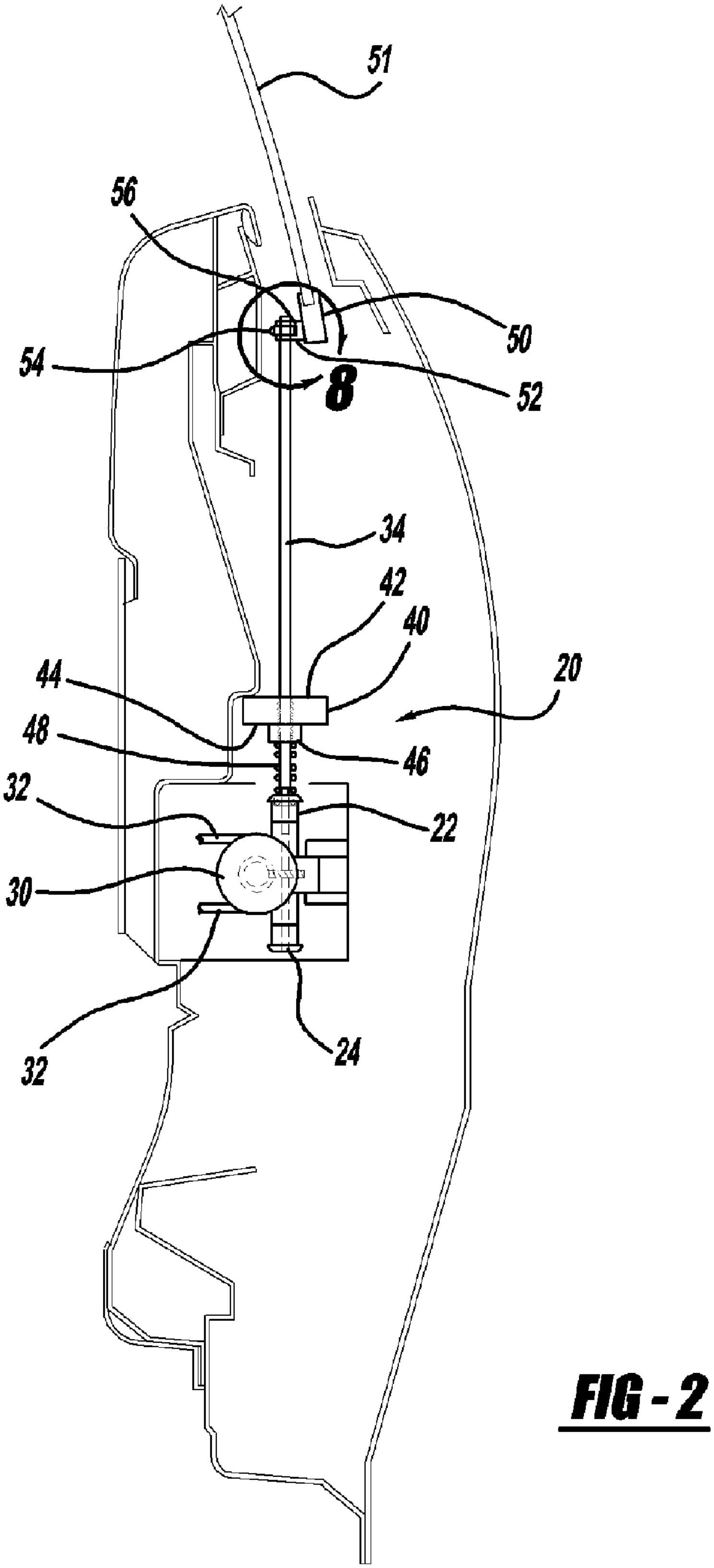
FIG. 2 is a side elevation view of the anti-pinch power window system of FIG. 1, wherein the window within the door is in the up position.

The motor 30 is an electrically reversible motor 30. A common automobile power window motor 30 or power seat motor 30 may be used. The motor 30 is adapted to rotate the rotatable hub 25 in two directions around the longitudinal axis of the hub 25. The motor 30 is engaged with the hub 25 such that the motor is capable of rotating the hub 25. The motor 30 has an input voltage line 32. FIG. 2 shows two wires 32 connected to the motor which power the motor. One of the wires 32 is a ground wire. The other is a hot wire which provides the input voltage. Some of the electrical schematic drawings show one input voltage line 32. This is intended to depict the hot wire 32 of FIG. 2.

The base 40 should be cylindrically shaped. The base 40 has internal threads adapted to mate with the threads of the threaded rod 34. The base 40 has a top side 42 and a bottom side 44. Preferably, the base 40 is fabricated from an oil impregnated material such as that currently sold under the trademark DELRIN. This will help prevent galling caused by the spring 48 contacting a rotating base 40. It will also reduce friction between the base 40 and a stop roller 47. The base 40 is threaded onto the lower section 38 of the threaded rod 34. The base 40 is secured to the threaded rod 34 by and alien screw.

Figure 7:
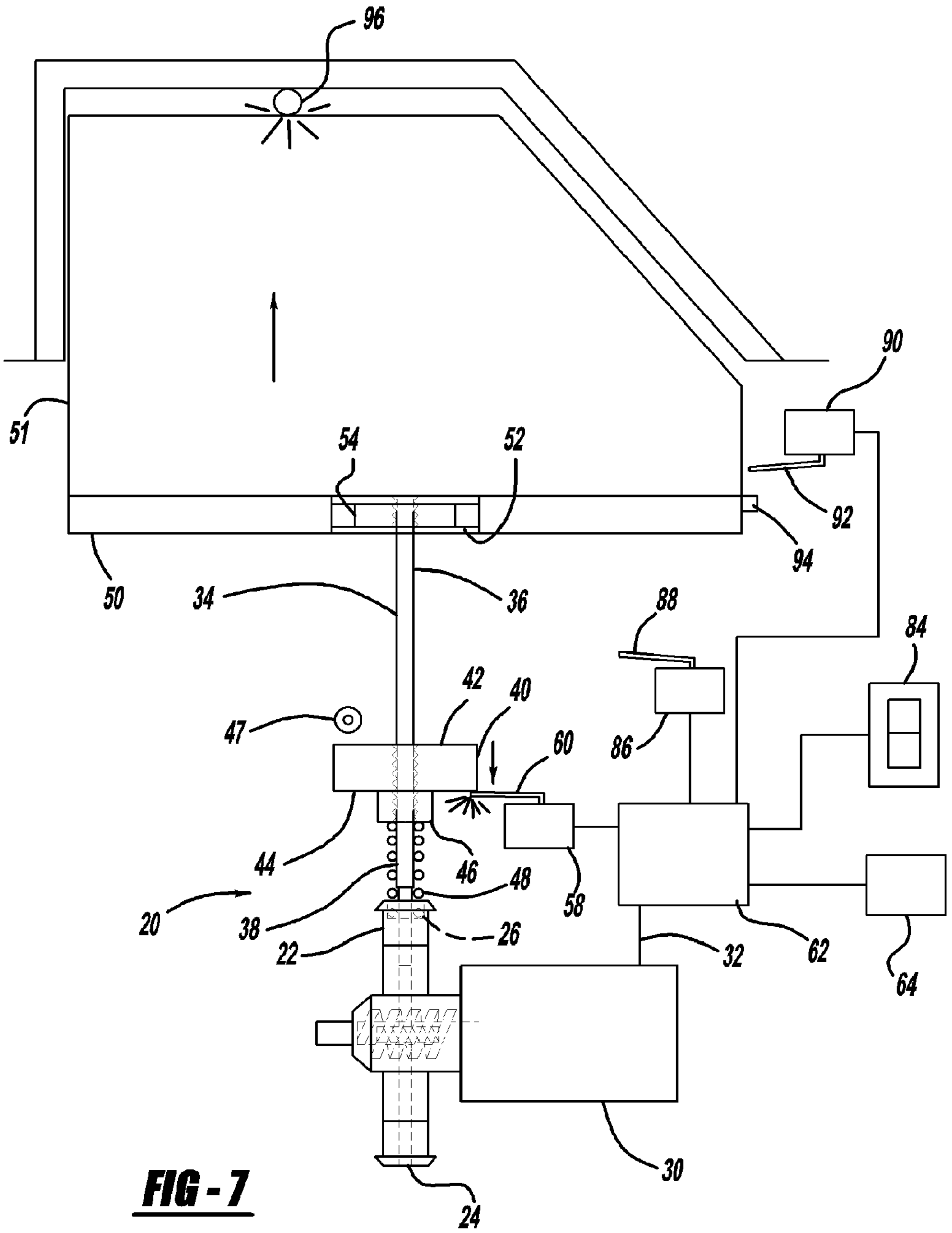
FIG. 7 is a front elevation view of the anti-pinch power window system of FIG. 2, showing the window within the door moving in the up direction and encountering an obstruction.
Figure 8:
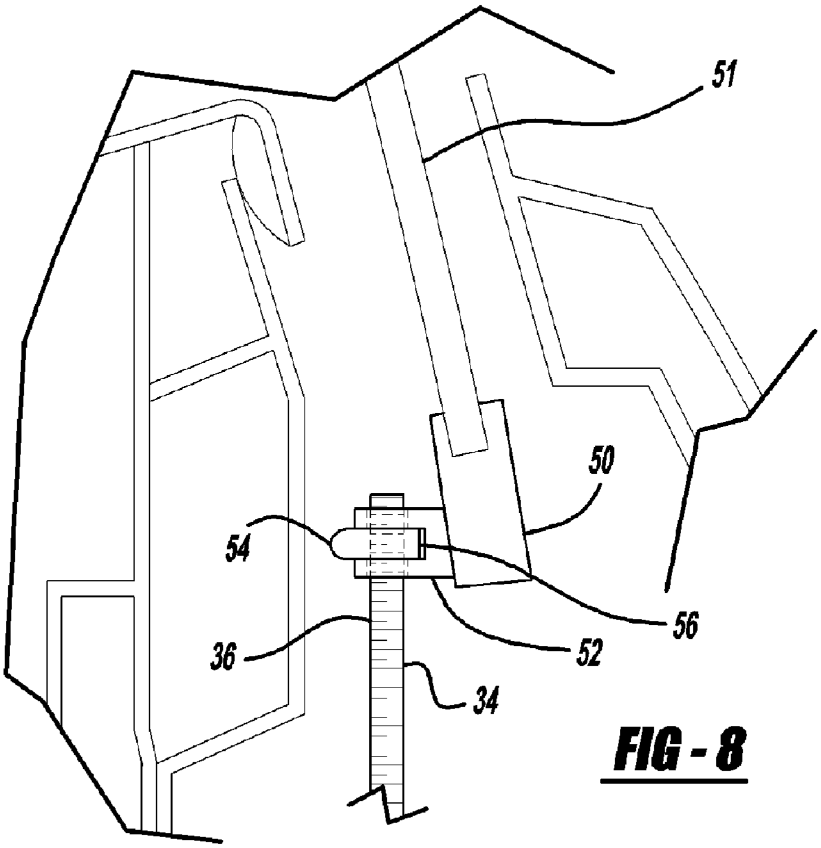
FIG. 8 is an enlarged partial elevation view of the anti-pinch power window system of FIG. 2, showing the threaded drive nut, bracket, threaded rod and window frame.
Figure 9:
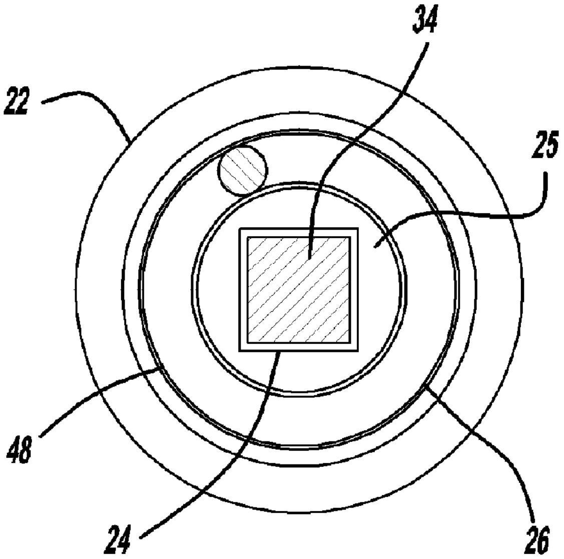
FIG. 9 is a sectional plan view showing a section of the hub, spring and threaded rod shown in FIG. 3.
Figure 10:
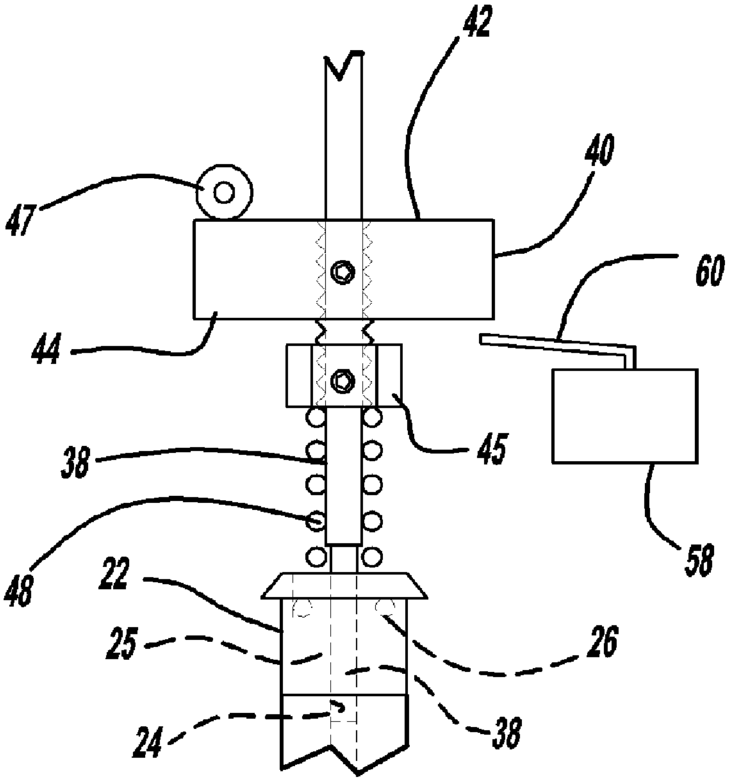
FIG. 10 is an enlarged partial elevation view showing an adjustable spring seat threaded into the hub.

The spring 48 is positioned so that it surrounds the lower section 38 of the threaded rod 34. One end of the spring 48 sits within the seat 26 provided by the boot 22 which surrounds the hub 25. The other end of the spring 48 is in contact with the bottom side 44 of the base 40, which may include an upper spring seat 46 extending from the bottom side 44 of the base 40. Preferably, the bottom side 44 of the base 40 is provided with an upper spring seat 46, as shown in FIG. 7. The upper spring seat 46 has a smaller outer diameter than the part of the base 40 to which it is contiguous. The upper spring seat 46 is in contact with the other end of the spring 48. As a result, the spring 48 is compressible by movement of the base 40 toward the hub 25. The upper spring seat 46 may be positionally adjustable, as shown in FIG. 10.

The frame 50 is sized and shaped to hold a window 51. The window 51 may be a conventional window 51 or a sunroof. The frame 50 may be a conventional automobile power window frame or sunroof frame. The bracket 52 is attached to the frame 50. The frame 50 has its powered opening and closing force applied through the bracket 52. The bracket 52 is shaped to hold the drive nut 54 sufficiently close to the bracket 52 or the frame 50 so that the drive nut 54 will not rotate. The bracket 52 contains an opening which will permit the threaded rod 34 to pass through it.

The drive nut 54 has internal threads which mate with the threads of the threaded rod 34. The drive nut 54 is adapted and positioned within the bracket 52 such that rotation of the drive nut 54 is limited. This will cause a window 51 within the frame 50 to move in response to rotation of the threaded rod 34. The drive nut 54 has a flat edge 56. When the flat edge 56 of the drive nut 54 contacts the bracket 52 or the frame 50 rotation of the drive nut 54 will be prevented. The drive nut 54 is positioned within the bracket 52 and threaded onto the upper section 36 of the threaded rod 34. Rotation of the threaded rod 34 will tend to cause the frame 50 to rise or lower.

Figure 5:
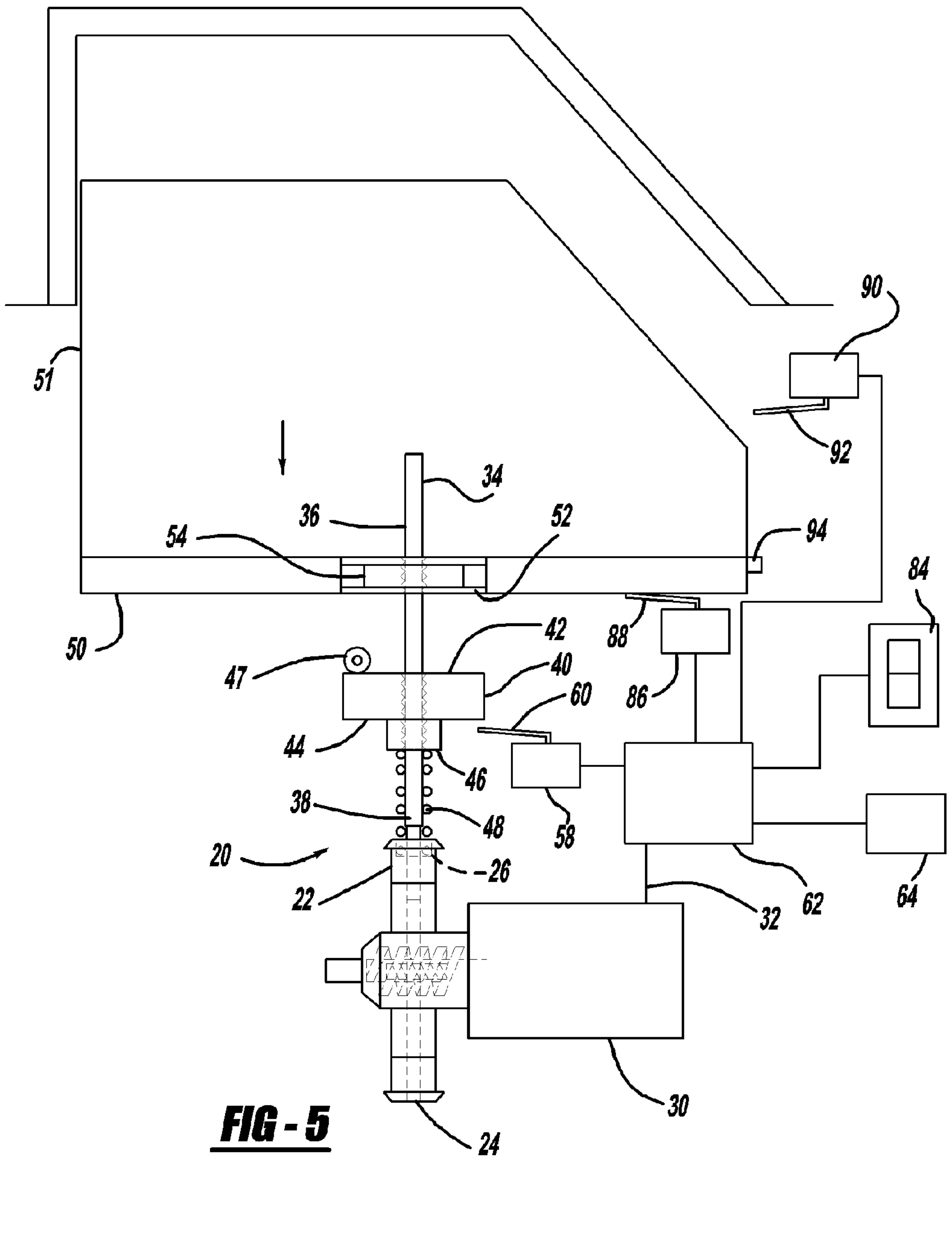
FIG. 5 is a front elevation view of the anti-pinch power window system of FIG. 2, wherein the window within the door is in the down position.
Figure 6:
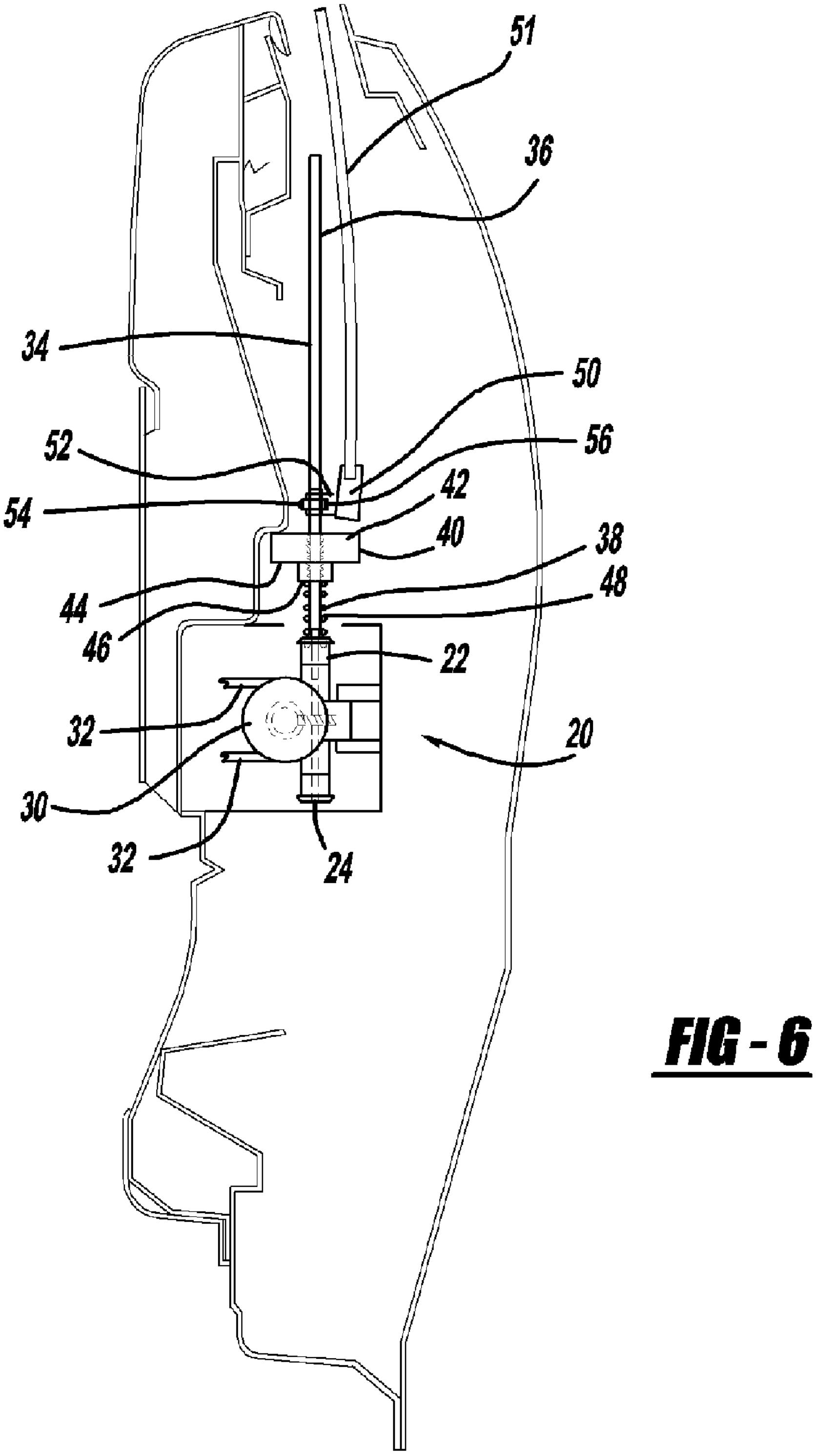
FIG. 6 is a side elevation view of the anti-pinch power window system of FIG. 1, wherein the window within the door is in the down position.

Optionally, a stop roller 47 is positioned so that its longitudinal axis is perpendicular to the longitudinal axis of the threaded rod 34 and such that its periphery is in contact with the top side 42 of the base 40, as shown in FIG. 5. The stop roller 47 may be secured to a part of the structure within which the anti-pinch power window system 20 is placed. The stop roller 47 prevents movement of the base of 40 away from the hub 25. Preferably, the stop roller 47 is fabricated from an oil impregnated material such as that currently sold under the trademark DELRIN.

Figure 3:
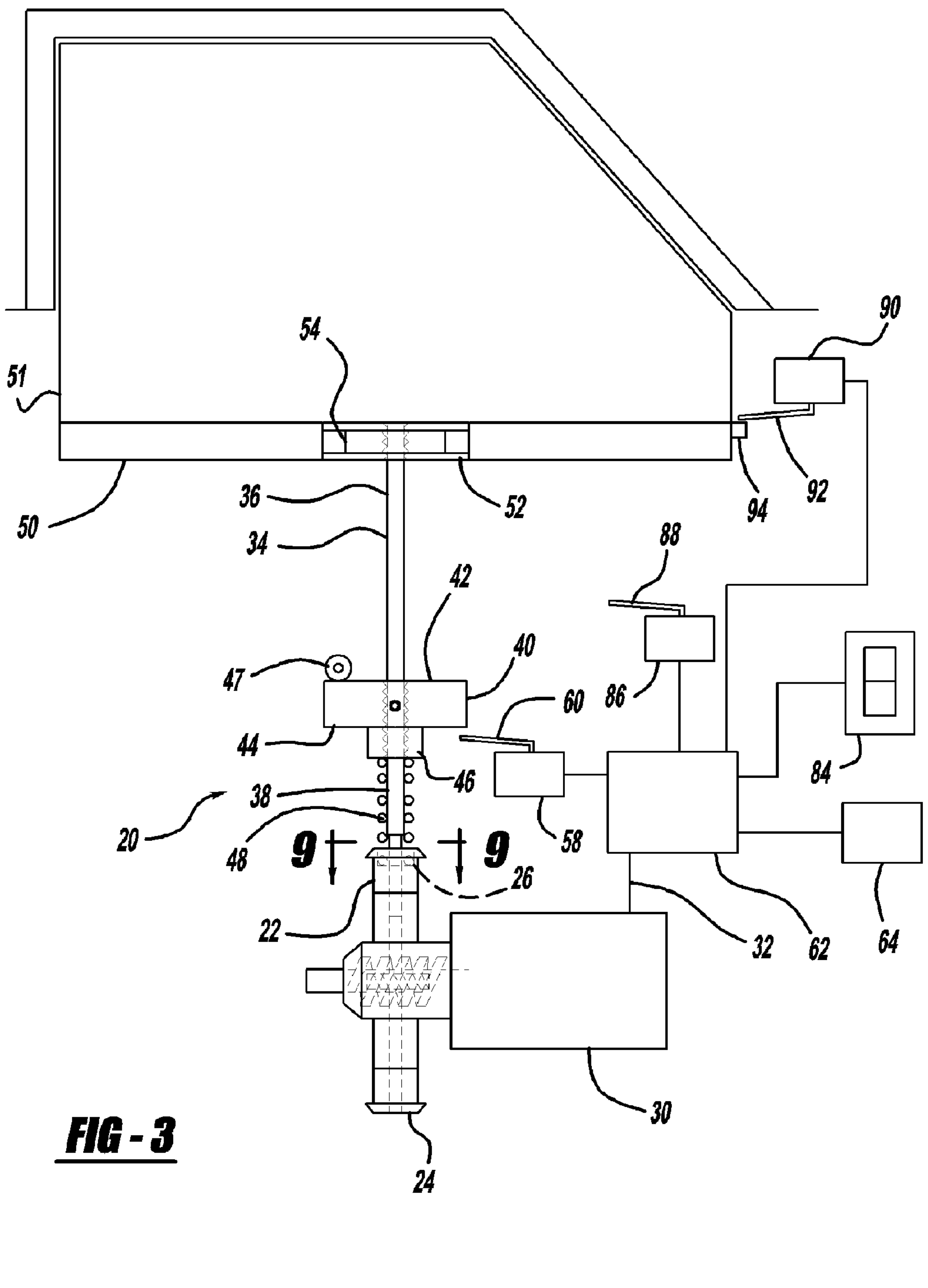
FIG. 3 is a front elevation view of the anti-pinch power window system of FIG. 2.

The reversing switch 58 has a mechanical activator 60. Movement of the mechanical activator 60 causes the reversing switch 58 to open and close. The mechanical activator 60 of the reversing switch 58 is positioned between the bottom side 44 of the base 40 and the hub 25, as shown in FIG. 3. As a result, movement of the base 40 toward the hub 25 will deflect the mechanical activator 60 and change the state of the reversing switch 60. Deflection of the mechanical activator 60 causes the reversing switch 58 to open or close.

The reversing switch 58 cooperates with an electronic circuit 62 to reverse the polarity of the voltage powering the motor 30 such that changing the state of the reversing switch 58 once reverses the rotational direction of the threaded rod 34.

Optionally, the anti-pinch power window system 20 may include a positionally adjustable spring seat 46 in contact with the spring, as shown in FIG. 10. This will permit the force exerted by the spring 48 upon the threaded rod 34 to be adjusted. Thus, the amount of force created by an obstruction 96 during the closing cycle of the window 51 which will activate the reversing switch 58 and prevent the window 51 from closing further (by stopping it or reversing its direction) can be adjusted. Preferably, the positionally adjustable spring seat 46 is an internally threaded cylinder having an outer diameter which is smaller than the outer diameter of the base 40. The internal threads are adapted to mate with the threads of the threaded rod 34. The positionally adjustable spring seat 46 is positioned so that it is in contact with the end of the spring 48 nearest the base 40. Further, the positionally adjustable spring seat 46 is adjusted so that it compresses the spring 48 to a selected and desired degree. The positionally adjustable spring seat 46 should be secured to the threaded rod 34 by an alien screw. In order to prevent galling by the spring 48, the spring seat 45, 46 should be fabricated from an oil impregnated material such as that currently sold under the trademark DELRIN, whether or not the spring seat 45, 46 is integral to the base 40.

Figure 4:
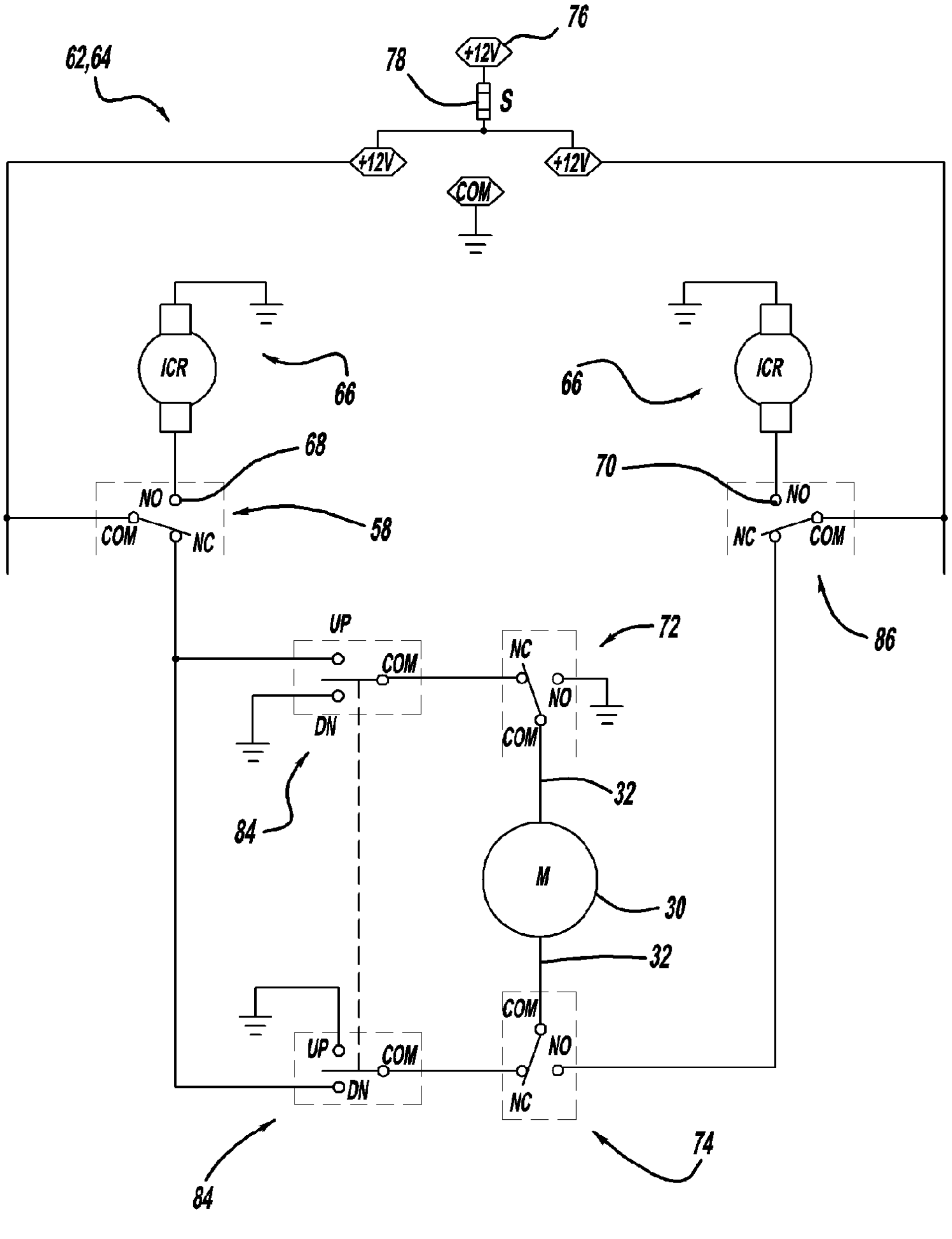
FIG. 4 is a schematic diagram of an electronic circuit providing an input voltage to the motor powering the anti-pinch power window system of FIG. 1.

The preferred electronic components and circuit 62 used during the operation of the anti-pinch power window system and utilized to reverse the polarity of the voltage powering the motor 30 such that changing the state of the reversing switch 58 once reverses the rotational direction of the threaded rod 34, are shown in block diagram form in FIGS. 3, 5 and 7 and in schematic diagram form in FIG. 4. An open/close switch 84 is electrically connected to the electronic circuit 62, as shown in FIGS. 3, 4, 5 and 7. The open/close switch 84 is used to open and close the window 51 or sunroof. A down limit switch 86 is positioned below the frame 50 such that the down limit switch 86 changes state in response to the frame 50 reaching a pre-determined down position. The down limit switch 86 has a mechanical activator 88 which becomes compressed when the frame 50 reaches its predetermined down position. The frame 50 also has an up limit switch mechanical activator tab 94. The up limit switch mechanical activator tab 94 is positioned on the frame 50 and with respect to the mechanical activator 92 of an up limit switch 90 such that it causes the up limit switch 90 to change state when the window 51 traverses from an open position, as shown in FIG. 5, and reaches a closed position, as shown in FIG. 3. Preferably, the up limit switch 90 and the down limit switch 86 are electrically connected to the electronic circuit 62 such that compression of the mechanical activator 92, 88 of either switch 90, 86 cuts off the voltage powering the motor 30.

In order for the reversing switch 58 to cooperate with the electronic circuit 62 to reverse the polarity of the voltage powering the motor 30 such that changing the state of the reversing switch 58 once reverses the rotational direction of the threaded rod 34, it is preferred that the electronic circuit 62 utilize a flip-flop switch 64, as shown in FIG. 4. The flip-flop switch 64 has two stable states. One state causes the motor 30 to be driven in a clockwise direction. The other state causes the motor 30 to be driven in a counterclockwise direction. The flip-flop switch 64 is comprised of a latching relay 66. The latching relay 66 has a latch/set contact 68 and an unlatch/reset contact 70. The reversing switch 58 is schematically depicted in FIG. 4. One contact of the reversing switch 58 is electrically connected to an input voltage source 76. The input voltage source 76 provides the power for the motor 30. The input voltage source 76 utilizes a conventional fuse 78 to protect against short-circuits. One contact of the down limit switch 86 is also electrically connected to the fused input voltage source 76. Both the reversing switch 58 and the down limit switch 86 have normally open and normally closed contacts. The input voltage is applied to each switch 58, 86 such that that voltage is communicated to the normally closed contacts of the switches 58, 86 unless the respective mechanical activators 60, 88 of the switches 58, 86 are compressed. Compression of the mechanical activator 60, 88 of either switch 60, 86 causes the input voltage 76 to be communicated to the normally open contacts of the switch 58, 86. The normally open contact of the reversing switch 58 is electrically connected to the latch/set contact of the latching relay 66. The normally open contact of the down limit switch 86 is electrically connected to the unlatch/reset contact 70 of the latching relay 66.

The latching relay 66 has first latching relay output contacts 72 and second latching relay output contacts 74, as shown in FIG. 4. The first latching relay output contacts 72 and the second latching relay output contacts 74 each have three sets of contacts, as shown in FIG. 4. Each set of latching relay output contacts 72, 74 has a common contact, a normally closed contact and a normally open contact, as shown in FIG. 4. The latching relay output contacts 72, 74 are wired as shown in FIG. 4. FIG. 4 also shows the electrical operative detail of the open/close switch 84. The open/close switch 84 has a neutral position, an up position and a down position. Power is only applied to the motor 30 when the open/close switch 84 is in the up position or the down position.

To cause the window 51 to close, the open/close switch is moved to the up position. This causes a normal voltage polarity to be applied to the motor 30 causing the motor 30 to rotate in a direction tending to close the window 51. If an obstruction 96 is encountered by the window 51, the bottom side 44 of the base 40 compresses the mechanical activator 60 of the reversing switch 58. This causes the first latching relay output contacts 72 and the second latching relay output contacts 74 to change from the normally closed state to the normally open state. As can be seen from FIG. 4, such a change of state of the latching relay output contacts 72, 74 reverses the input voltage to the motor 30. As a result the window 51 which was traveling in a closing direction begins traveling in an opening direction. The window continues to travel in an opening direction until the open/close switch 84 returns to the neutral position or the mechanical activator 88 of the down limit switch 86 becomes compressed. When the mechanical activator 88 of the down limit switch 86 becomes compressed, the latching relay 66 is reset so that the window 51 will respond to the normal operation of the open/close switch 84. If the open/close switch 84 is switched to the up position, the window 51 will begin closing. If the open/close switch 84 is switched to the down position, the window 51 will begin opening.

Changing the state of the reversing switch 58 once reverses the rotational direction of the threaded rod 34. In other words, if the window 51 is traveling in a closing direction and encounters an obstruction 96 the mechanical activator 60 will become compressed and change the state of the reversing switch 58. This will cause the input voltage to the motor 30 to be reversed and cause the window to begin opening. Although the mechanical activator 60 of the reversing switch 58 decompresses while the window 51 is opening, causing another change of state of the reversing switch 58, the latching relay 66 does not respond to this second change of state of the reversing switch 58. Thus, the window 51 will continue to open even after the obstructing force caused by the obstruction 96 is removed.

The anti-pinch power window system 20 described herein opens and closes a window 51 in the same manner that a conventional power window system opens and closes a window. However, when the window 51 meets an obstruction 96 during a closing cycle, the anti-pinch power window system 20 causes the direction of the window 51 to reverse, thereby preventing and limiting damage or injury to the obstruction 96. When the anti-pinch power window system 20 is configured as an anti-pinch power sunroof system, damage or injury to an obstruction during the closing cycle of the sunroof is similarly prevented and limited.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions and methods insofar as they do not depart from the spirit and scope of the present invention.

What is claimed is:

1. An anti-pinch power window system comprising:

a threaded rod;

a hub adapted to hold the threaded rod, said hub being further adapted to allow the threaded rod to slide along its longitudinal axis within said hub, said threaded rod being attached to the hub;

a base having a top side and a bottom side attached to the threaded rod;

a spring positioned between the bottom side of the base and the hub such that the spring is compressible by movement of the base toward the hub;

a bracket attachable to a frame for retaining a drive nut;

a threaded drive nut screwed onto the threaded rod, said drive nut being positioned within the bracket such that rotation of the drive nut is limited, for moving a window in response to rotation of the threaded rod; and a switch positioned between the bottom side of the base and the hub such that movement of the base toward the hub will change the state of the switch.

2. The anti-pinch power window system of claim 1, further comprising:

a motor engaged with the hub such that said motor is capable of rotating the hub, the rotational direction of said motor being selectable by the polarity of an input voltage powering the motor;

a frame attached to the bracket, wherein the frame is a window frame or a sunroof frame; and wherein said switch cooperates with an electronic circuit to change the polarity of the voltage powering the motor in response to a change of state of the switch.

3. The anti-pinch power window system of claim 2, wherein the electronic circuit is comprised of a flip-flop switch which changes state in response to the change of state of the switch positioned between the base and the hub, said flip-flop switch being wired to reverse the polarity of the input voltage to the motor in response to a change of state of the flip-flop switch.

4. The anti-pinch power window system of claim 1, further comprising a base stop roller in contact with the top side of the base for preventing movement of the base away from the hub.

5. The anti-pinch power window system of claim 1, further comprising a positionally adjustable spring seat in contact with the spring, for adjusting the force exerted by the spring upon the threaded rod.

6. An anti-pinch power window system comprising:

a threaded rod;

a hub adapted to hold the threaded rod, said hub being further adapted to allow the threaded rod to slide along its longitudinal axis within said hub, said threaded rod being attached to the hub;

an electrically reversible motor engaged with the hub such that said motor is capable of rotating the hub, the rotational direction of said motor being selectable by the polarity of an input voltage powering the motor;

a base having a top side and a bottom side attached to the threaded rod;

a spring positioned between the bottom side of the base and the hub such that the spring is compressible by movement of the base toward the hub;

a frame;

a bracket attached to the frame for retaining a drive nut;

a threaded drive nut screwed onto the threaded rod, said drive nut being positioned within the bracket such that rotation of the drive nut is limited, for moving a window within the frame in response to rotation of the threaded rod; and a switch positioned between the bottom side of the base and the hub such that movement of the base toward the hub will change the state of the switch, said switch cooperating with an electronic circuit to reverse the polarity of the voltage powering the motor such that changing the state of the switch once reverses the rotational direction of the threaded rod.

7. The anti-pinch power window system of claim 6, further comprising a base stop roller in contact with the top side of the base for preventing movement of the base away from the hub.

8. The anti-pinch power window system of claim 6, wherein the frame is a window frame.

9. The anti-pinch power window system of claim 6, wherein the frame is a sunroof frame.

10. The anti-pinch power window system of claim 6, further comprising a positionally adjustable spring seat in contact with the spring, for adjusting the force exerted by the spring upon the threaded rod.

11. The anti-pinch power window system of claim 6, wherein the electronic circuit is comprised of a flip-flop switch which changes state in response to a change of state of the switch positioned between the base and the hub, said flip-flop switch being wired to reverse the polarity of the input voltage to the motor in response to a change of state of the flip-flop switch.

12. An anti-pinch power window system comprising:

a threaded rod having an upper section and a lower section;

a rotatable hub adapted to securely hold the threaded rod, said hub being further adapted to allow the threaded rod to slide along its longitudinal axis within said hub, said threaded rod being attached to the hub;

an electrically reversible motor adapted to rotate said rotatable hub in two directions around the longitudinal axis of the hub, said motor being engaged with the hub such that said motor is capable of rotating the hub, the rotational direction of said motor being selectable by the polarity of an input voltage powering the motor;

a base having a top side and a bottom side securely attached to the lower section of the threaded rod;

a spring surrounding the threaded rod, said spring being positioned between the bottom side of the base and the hub such that the spring is compressible by movement of the base toward the hub;

a frame;

a bracket attached to the frame for retaining a drive nut;

a threaded drive nut screwed onto the threaded rod, said drive nut being adapted and positioned within the bracket such that rotation of the drive nut is limited, for moving a window within the frame in response to rotation of the threaded rod; and a reversing switch having a mechanical activator, said mechanical activator being positioned between the bottom side of the base and the hub such that movement of the base toward the hub will change the state of the reversing switch, said reversing switch cooperating with an electronic circuit to reverse the polarity of the voltage powering the motor such that changing the state of the reversing switch once reverses the rotational direction of the threaded rod.

13. The anti-pinch power window system of claim 12, further comprising a base stop roller in contact with the top side of the base for preventing movement of the base away from the hub.

14. The anti-pinch power window system of claim 12, wherein the frame is a window frame.

15. The anti-pinch power window system of claim 12, wherein the frame is a sunroof frame.

16. The anti-pinch power window system of claim 12, further comprising a positionally adjustable spring seat in contact with the spring, for adjusting the force exerted by the spring upon the threaded rod.

17. The anti-pinch power window system of claim 12, wherein the electronic circuit is comprised of a flip-flop switch which changes state in response to a change of state of the switch positioned between the base and the hub, said flip-flop switch being wired to reverse the polarity of the input voltage to the motor in response to a change of state of the flip-flop switch.

* * * * *